United States Patent
Wei et al.

(10) Patent No.: US 8,980,215 B2
(45) Date of Patent: Mar. 17, 2015

(54) METHOD FOR PREPARING ULTRAFINE TUNGSTEN CARBIDE POWDER

(75) Inventors: Baiwan Wei, Jiangxi (CN); Zhao Lin, Jiangxi (CN); Zhifeng Li, Jiangxi (CN); Anshi Zou, Jiangxi (CN); Yi Wu, Jiangxi (CN)

(73) Assignee: Jiangxi Rare Earth and Rare Metals Tungsten Group Corporation, Jiangxi (CN)

( * ) Notice: Subject to any disclaimer, the term of this patent is extended or adjusted under 35 U.S.C. 154(b) by 443 days.

(21) Appl. No.: 13/509,621

(22) PCT Filed: Dec. 30, 2009

(86) PCT No.: PCT/CN2009/076278
§ 371 (c)(1),
(2), (4) Date: May 14, 2012

(87) PCT Pub. No.: WO2011/057462
PCT Pub. Date: May 19, 2011

(65) Prior Publication Data
US 2013/0004407 A1  Jan. 3, 2013

(30) Foreign Application Priority Data
Nov. 16, 2009  (CN) .......................... 2009 1 0223448

(51) Int. Cl.
*C01B 31/34* (2006.01)
*C23C 8/06* (2006.01)

(52) U.S. Cl.
CPC ..................................... *C01B 31/34* (2013.01)
USPC .......................................... 423/440; 148/281

(58) Field of Classification Search
None
See application file for complete search history.

(56) References Cited

U.S. PATENT DOCUMENTS

| 5,131,992 A | 7/1992 | Church et al. |
| 6,447,742 B1 * | 9/2002 | Lackner et al. ............... 423/440 |
| 2004/0265208 A1 | 12/2004 | Zhang et al. |

FOREIGN PATENT DOCUMENTS

CN  101264888 A  9/2008

* cited by examiner

*Primary Examiner* — Melvin C Mayes
*Assistant Examiner* — Michael Forrest
(74) *Attorney, Agent, or Firm* — Hammer & Associates, P.C.

(57) ABSTRACT

A method for preparing ultrafine powder of tungsten carbide using ultrafine tungsten powder and carbon black as raw materials is provided. The following steps are included: (1) passivation of the ultrafine tungsten powder: passivating the ultrafine tungsten powder under pure carbon dioxide; (2) carbon addition: mixing the ultrafine tungsten powder with carbon black powder after applying cooling water and inert gases; (3) carbonization: synthesizing the bulk tungsten carbide powder at high temperature in a carbonizing stove; (4) crushing and sieving: crushing the bulk tungsten carbide powder, cooling and sieving to obtain the ultrafine powder of tungsten carbide.

5 Claims, 1 Drawing Sheet

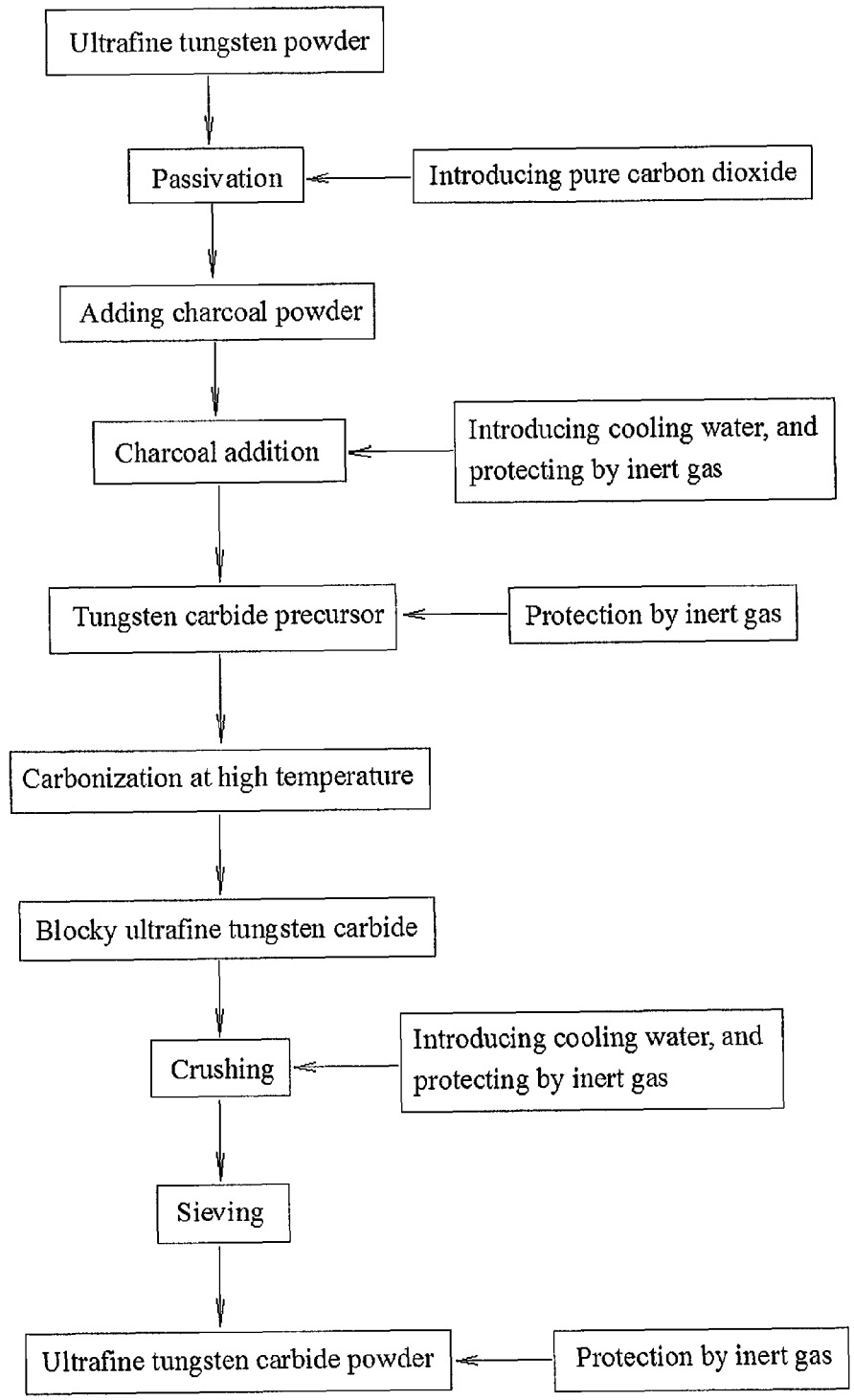

METHOD FOR PREPARING ULTRAFINE TUNGSTEN CARBIDE POWDER

TECHNICAL FIELD

The present invention relates to a preparing process of hard alloy powder in metallurgical field, particularly to a method for preparing ultrafine tungsten carbide powder or ultrafine powder of tungsten carbide.

BACKGROUND OF INVENTION

Ultrafine hard alloys are tool materials developed in recent years, and the production of hard alloy materials with high hardness, high wear resistance and high toughness is mainly based on materials of ultra-fine WC powder, with addition of an appropriate binder (such as Co) and a grain growth inhibitor. With higher performance than conventional hard alloys, they have shown increasingly wide application prospects in areas such as low-machinability tools of metal materials, microbits of electronics industry, precision moulds and medical dental drills. The preparation of ultrafine WC powder is divided into two categories according to whether the process of reduction carbonization thereof is continuous or not: (1) a two-step method of reduction carbonization, in which W powder is first prepared from a tungsten-containing precursor, then reacted with carbonaceous substance to form WC powder by carbonization. (2) a single-step method of reduction carbonization, in which a tungsten-containing precursor (such as $WO_3$) is subject to direct reduction carbonization to form WC powder, and generally a tungsten precursor with a higher activity is required to be prepared. Now, in industrial production, a precursor mixture of ultrafine tungsten powder and charcoal powder is generally used to produce ultrafine tungsten carbide powder by carbonization at high temperature. In this method, however, the ultrafine tungsten powder has a large specific surface area with a high surface activity, thus a slight contact with air will cause spontaneous combustion, affecting the product quality and resulting in material loss.

SUMMARY OF INVENTION

An object of the invention is to provide a method for preparing ultrafine tungsten carbide powder, which can reduce oxidation and spontaneous combustion of the precursors, and make the ultrafine tungsten carbide powder prepared not prone to spontaneous combustion, and the oxygen content low.

Thus, the present invention provides a method for preparing ultrafine tungsten carbide powder from ultrafine tungsten powder and carbon blacks as raw materials, characterized by the following steps: (1) passivation of ultrafine tungsten powder, in which a pure carbon dioxide gas is introduced into the ultrafine tungsten powder which is then allowed for standing alone to cause surface passivation of the ultrafine tungsten powder; (2) charcoal addition (carbon addition), in which the passivated ultrafine tungsten powder and charcoal powder are charged into a charcoal addition apparatus, cooled down by cooling water, mixed under the protection of an inert gas introduced, and followed by natural cooling; (3) carbonization, in which the mixed ultrafine tungsten powder and charcoal powder are subject to carbonization at a high temperature in a carbonization furnace to synthesize blocky tungsten carbide powder (bulk tungsten carbide powder); (4) crushing and sieving, in which the blocky tungsten carbide powder is charged into a crusher, crushed, cooled and then sieved to obtain the desired tungsten carbide powder.

In the passivating step of the ultrafine tungsten powder, the pure carbon dioxide gas is introduced into the ultrafine tungsten powder and the ultrafine tungsten powder is allowed for standing alone for more than 12 hours to cause surface passivation of the ultrafine tungsten powder, thereby preventing spontaneous combustion of the ultrafine tungsten powder.

In the step of charcoal addition, cooling water is used continuously to cool the barrel wall of the charcoal addition apparatus, thereby lowering temperature of the precursors of the ultrafine tungsten powder and the charcoal powder. Also in the step of charcoal addition, an inert gas can be introduced continuously into the precursors of the ultrafine tungsten powder and the charcoal powder to prevent the materials from contacting with air.

In the step of crushing and sieving, the crushed tungsten carbide powder can be cooled down by cooling water before sieving.

Also in the step of crushing and sieving, the sieving can be conducted under the protection of an inert gas introduced to protect the ultrafine powder.

In the method of the present invention, the raw material of ultrafine tungsten powder is first passivated by pure carbon dioxide gas. In the subsequent steps, methods of cooling down by cooling water and introducing inert gas are utilized to lower the temperature of the powder and the surface activity to prevent the precursor from contacting with air, thus the oxidation and spontaneous combustion of the precursor formed from the ultrafine tungsten powder and the charcoal powder are prevented, so the product quality is improved, and the loss of materials is reduced. The ultrafine tungsten carbide powder produced by this method are not prone to spontaneous combustion, and the oxygen content thereof is reduced by 20 to 40% as compared to that of ultrafine products of tungsten carbide powder prepared by conventional methods. In the process of charcoal addition, the weight of the ultrafine tungsten powder and the carbon powder in the charcoal addition mixing apparatus is increased, with the mixing amount of the ultrafine tungsten powder and the carbon powder become 1 to 2 times that of the conventional methods, and the production efficiency is increased.

Also stated as—A method for preparing ultrafine tungsten carbide powder, comprises the following steps: (1) passivation of ultrafine tungsten powder, in which a pure carbon dioxide gas is introduced into the ultrafine tungsten powder and then allowed for standing alone to cause surface passivation of the ultrafine tungsten powder; (2) charcoal addition, in which the passivated ultrafine tungsten powder and charcoal powder are charged into a charcoal addition apparatus, cooled down by cooling water, mixed under the protection of an inert gas introduced, and followed by natural cooling; (3) carbonization, in which the mixed ultrafine tungsten powder and charcoal powder are subject to carbonization at a high temperature in a carbonization furnace to synthesize blocky tungsten carbide powder; (4) crushing and sieving, in which the blocky tungsten carbide powder is charged into a crusher, crushed, cooled, and then sieved to obtain the desired tungsten carbide powder. According to the method of the present invention, the precursor from contacting with air is prevented, thus the oxidation and spontaneous combustion of the precursor formed from the ultrafine tungsten powder and the charcoal powder are prevented, the product quality is improved, and the loss of materials is reduced.

BRIEF DESCRIPTION OF THE ACCOMPANYING DRAWING

FIG. 1 is a flow chart of the production of the ultrafine tungsten carbide powder according to the method of the present invention.

DETAILED DESCRIPTION OF PREFERRED EMBODIMENT

As shown in FIG. 1, according to the method of the present invention, ultrafine tungsten carbide powder is prepared from ultrafine tungsten powder and charcoal powder as raw materials by the following steps:

(1) Passivation of Ultrafine Tungsten Powder

A pure carbon dioxide gas is introduced into the ultrafine tungsten powder and the ultrafine tungsten powder is allowed for standing alone for more than 12 hours to cause a surface passivation of the ultrafine tungsten powder, whereby the surface activity of the tungsten powder is reduced.

(2) Charcoal Addition 300 to 500 kg of the passivated ultrafine tungsten powder from step (1) with a Fisher particle size of 0.4 μm and a specific surface area of 5 m$^2$/g is charged into a charcoal addition apparatus, to which charcoal powder and additive are added, and then cooled down by cooling water, mixed for 3 to 5 hours under the protection of an inert gas introduced, followed by 10 to 14 hours of natural cooling. The additive may be a hard alloy grain growth inhibitor, such as chromium and vanadium.

(3) Carbonization

The well mixed ultrafine tungsten powder and charcoal powder from step (2) are charged into a utensil of a corresponding production specification and subject to reaction at a high temperature of 1000 to 1400° C. in a high-temperature molybdenum filament carbonization furnace, in which blocky tungsten carbide powder is synthesized from the tungsten powder and the charcoal powder.

(4) Crushing and Sieving

The blocky tungsten carbide powder obtained from step (3) is charged into a crusher and crushed for 2 to 4 hours, cooled naturally, and then passed through a stainless steel sieve of 100 to 140 meshes to obtain the ultrafine tungsten carbide powder. An inert gas is introduced before packaging.

The ultrafine tungsten carbide powder from step (4) is measured, with a Fisher particle size of 0.4 to 0.5 μm, a specific surface area of 2 to 3 m$^2$/g, and an oxygen content of 1500 to 1800 ppm.

The invention claimed is:

1. A method for preparing ultrafine tungsten carbide powder from ultrafine tungsten powder and carbon black as raw materials, comprising the following steps:
   (1) charcoal addition, in which a passivated ultrafine tungsten powder and charcoal powder are charged into a charcoal addition apparatus, cooled down by cooling water, mixed under the protection of an inert gas introduced, and followed by natural cooling;
   (2) carbonization, in which the mixed ultrafine tungsten powder and charcoal powder are subject to carbonization at a high temperature in a carbonization furnace to synthesize blocky tungsten carbide powders; and
   (3) crushing and sieving, in which the blocky tungsten carbide powder is charged into a crusher, crushed, cooled, and then sieved so as to obtain a desired tungsten carbide powder, characterized in that said method further comprises a pre-processing step of passivation of ultrafine tungsten powder, in which a pure carbon dioxide gas is introduced into the ultrafine tungsten powder, then the ultrafine tungsten powder is allowed for standing alone for more than 12 hours, so as to cause surface passivation of the ultrafine tungsten powder.

2. The method according to claim 1, characterized in that in step (1), the ultrafine tungsten powder and the carbon black are further cooled down by cooling water during the mixing process.

3. The method according to claim 1, characterized in that in step (1), the ultrafine tungsten powder and the carbon black are protected by an inert gas introduced during the mixing process.

4. The method according to claim 1, characterized in that in step (3), the crushed tungsten carbide powder is cooled down by cooling water before sieving.

5. The method according to claim 1, characterized in that in step (3), the crushed tungsten carbide powder is sieved under the protection of an inert gas introduced.

* * * * *